(12) United States Patent  (10) Patent No.: US 8,743,293 B1
Chang et al.  (45) Date of Patent: Jun. 3, 2014

(54) CONTROL METHOD OF AN AUDIO/VIDEO SYSTEM

(71) Applicant: AmTRAN Technology Co., Ltd, New Taipei (TW)

(72) Inventors: Chin-Chiang Chang, New Taipei (TW); Kuang-Cheng Chao, New Taipei (TW); Wei-Wen Mai, New Taipei (TW); Chien-Cheng Lin, New Taipei (TW); Min-I Chen, New Taipei (TW); Wen-Kang Wei, New Taipei (TW)

(73) Assignee: AmTran Technology Co., Ltd, Jhonghe District, New Taipei (TW)

( * ) Notice: Subject to any disclaimer, the term of this patent is extended or adjusted under 35 U.S.C. 154(b) by 0 days.

(21) Appl. No.: 13/783,401

(22) Filed: Mar. 4, 2013

(30) Foreign Application Priority Data

Nov. 14, 2012 (TW) .............................. 101142427 A (51) Int. Cl.
  *H04N 5/44* (2011.01)
(52) U.S. Cl.
  USPC ........... 348/725; 348/730; 348/731; 348/734; 348/705; 348/706; 348/656; 348/518; 348/372; 345/156; 333/160; 725/153; 725/131; 725/39; 725/38
(58) Field of Classification Search
  USPC ......... 348/725, 730, 731, 734, 705, 706, 656, 348/518, 372; 345/156; 725/153, 39, 38, 725/131; 333/160
  See application file for complete search history.

(56) References Cited

U.S. PATENT DOCUMENTS

| | | | | |
|---|---|---|---|---|
| 2004/0237114 | A1* | 11/2004 | Drazin | 725/105 |
| 2008/0225013 | A1* | 9/2008 | Muylkens et al. | 345/173 |
| 2009/0195566 | A1* | 8/2009 | Miyazaki | 345/690 |
| 2010/0003016 | A1* | 1/2010 | Ishimaru | 386/117 |
| 2010/0020183 | A1* | 1/2010 | Kimoto et al. | 348/207.11 |
| 2010/0141843 | A1* | 6/2010 | Vidal | 348/578 |
| 2010/0250988 | A1* | 9/2010 | Okuda et al. | 713/323 |
| 2010/0263016 | A1* | 10/2010 | Itoga | 725/153 |
| 2011/0138416 | A1* | 6/2011 | Kang et al. | 725/39 |
| 2012/0106920 | A1* | 5/2012 | Fitzsimmons | 386/230 |
| 2013/0024709 | A1* | 1/2013 | Park et al. | 713/323 |
| 2013/0061269 | A1* | 3/2013 | Johnson et al. | 725/60 |
| 2013/0176502 | A1* | 7/2013 | Nagata et al. | 348/725 |

* cited by examiner

*Primary Examiner* — Jefferey Harold
*Assistant Examiner* — Mustafizur Rahman
(74) *Attorney, Agent, or Firm* — Winston Hsu; Scott Margo (57) ABSTRACT

An audio/video system includes a display having a plurality of input sources and a first peripheral device connected to one of the input sources. The display provides a user interface for receiving a switching command for switching current input source of the display among the input sources from a user, and the display automatically generates a first standby command to the first peripheral device when the received switching command is not switching the current input source to the input source corresponding to the first peripheral device.

17 Claims, 5 Drawing Sheets

CONTROL METHOD OF AN AUDIO/VIDEO SYSTEM

BACKGROUND OF THE INVENTION

1. Field of the Invention

The present invention relates to a control method of an audio/video system, especially a method for making audio/video devices, which are not the input source of a display device, automatically entering into standby state so as to save power.

2. Description of the Prior Art

The high definition multimedia interface (HDMI) is widely used as a transmission interface of TVs, displays, notebooks and tablets due to the HDMI being capable of transmitting uncompressed high definition video data and multichannel audio data. The set-top box, video game console, Blu-ray player or other peripheral devices with the audio/video (A/V) processing functions generally have an HDMI port which can transmit processed A/V data or multimedia data to a display device for displaying images, thus increasing the functions of the system and allowing the user to more conveniently view multimedia images. For example, the user may view multimedia data other than programs of TV channels through connecting a multimedia set-top box to the display. When the user is controlling the multimedia set-top box, the multimedia set-top box will generate an on-screen display (OSD) menu displayed on the TV and the user can use a remote control to control the set-top box.

However, if the user wants to control the TV and the multimedia set-top box at the same time, the user has to use two remote controls corresponding to the set-top box and TV respectively. This could be very inconvenient to operate. Besides, the image of the multimedia set-top box's user interface must be firstly generated by the multimedia set-top box and then transmitted to the display device for displaying. If the TV of a multimedia system incorporates the control function of the set-top box so the user can use the remote control of the TV to control the set-top box, the control signal to the set-top box will be transmitted from the TV to the set-top box when the user controls the set-top box, and then the set-top box will generate image of the user interface after processing the control signals. After the image of user interface is transmitted to the TV, and the TV can display the result corresponding to the control signal accordingly. In this way, a period of time is required for transmitting the control signal and images, thus delaying the result of the user's control operations to the set-top box. Under this situation, the multimedia system can not provide real-time operations to the user.

In addition, the display devices of prior art usually include multiple signal input ports, e.g. the video graphics array (VGA), digital visual interface (DVI) and HDMI ports, for coupling to multiple A/V peripheral devices, e.g. personal computers, notebooks and multimedia set-top boxes. However, when a specific input port of a display device is selected as the signal source, the A/V devices corresponding to the unselected input ports will remain in current state instead of entering standby state automatically, thus increasing the overall power consumption. Moreover, it is very inconvenient for the user to manually turn off the peripheral devices corresponding to the unselected input ports one by one.

SUMMARY OF THE INVENTION

An embodiment of the present invention relates to an audio/video system, comprising a display having a plurality of input sources and a first peripheral device connected to one of the input sources. The display provides a user interface for receiving a switching command for switching current input source of the display among the input sources from a user, and the display automatically generates a first standby command to the first peripheral device when the received switching command is not switching the current input source to the input source corresponding to the first peripheral device.

Another embodiment of the present invention relates to a method of controlling an audio/video system. The audio/video system comprises a display, a first peripheral device and a second peripheral device connected to the display. The method comprises receiving a command to switch current input source of the display, wherein the command to switch current input source of the display selects the first peripheral device as current input source of the display, selecting the first peripheral device as current input source, receiving and displaying image data from the first peripheral device, and the display automatically generating a first standby command to be transmitted to the second peripheral device.

Another embodiment of the present invention relates to a display device, comprising a display component, a first connection port, a second connection port and a processor. The first connection port is capable of coupling to a first peripheral device. The second connection port is capable of coupling to a second peripheral device. The processor is connected to the display unit and generates a graphical user interface to be displayed by the display component, which allows a user to control the display device accordingly. The user interface provides an input source switching function, and when the display device receives a command to switch current input source which selects the first peripheral device as current input source of the display device, the processor will set the first peripheral device as current input source of the display device and automatically generates a standby command to the second peripheral device.

These and other objectives of the present invention will no doubt become obvious to those of ordinary skill in the art after reading the following detailed description of the preferred embodiment that is illustrated in the various figures and drawings.

DETAILED DESCRIPTION

Some phrases are referred to specific elements in the present specification and claims, please notice that the manufacturer might use different terms to refer to the same elements. However, the definition between elements is based on their functions instead of their names. Further, in the present specification and claims, the term "comprising" is open type and should not be viewed as the term "consisted of." Besides, the term "electrically coupled" can be referred to either directly connecting or indirectly connecting between elements.

The embodiments and figures are provided as follows in order to illustrate the present invention in detail, but please notice that the claimed scope of the present invention is not limited by the provided embodiments and figures.

Figure 1:
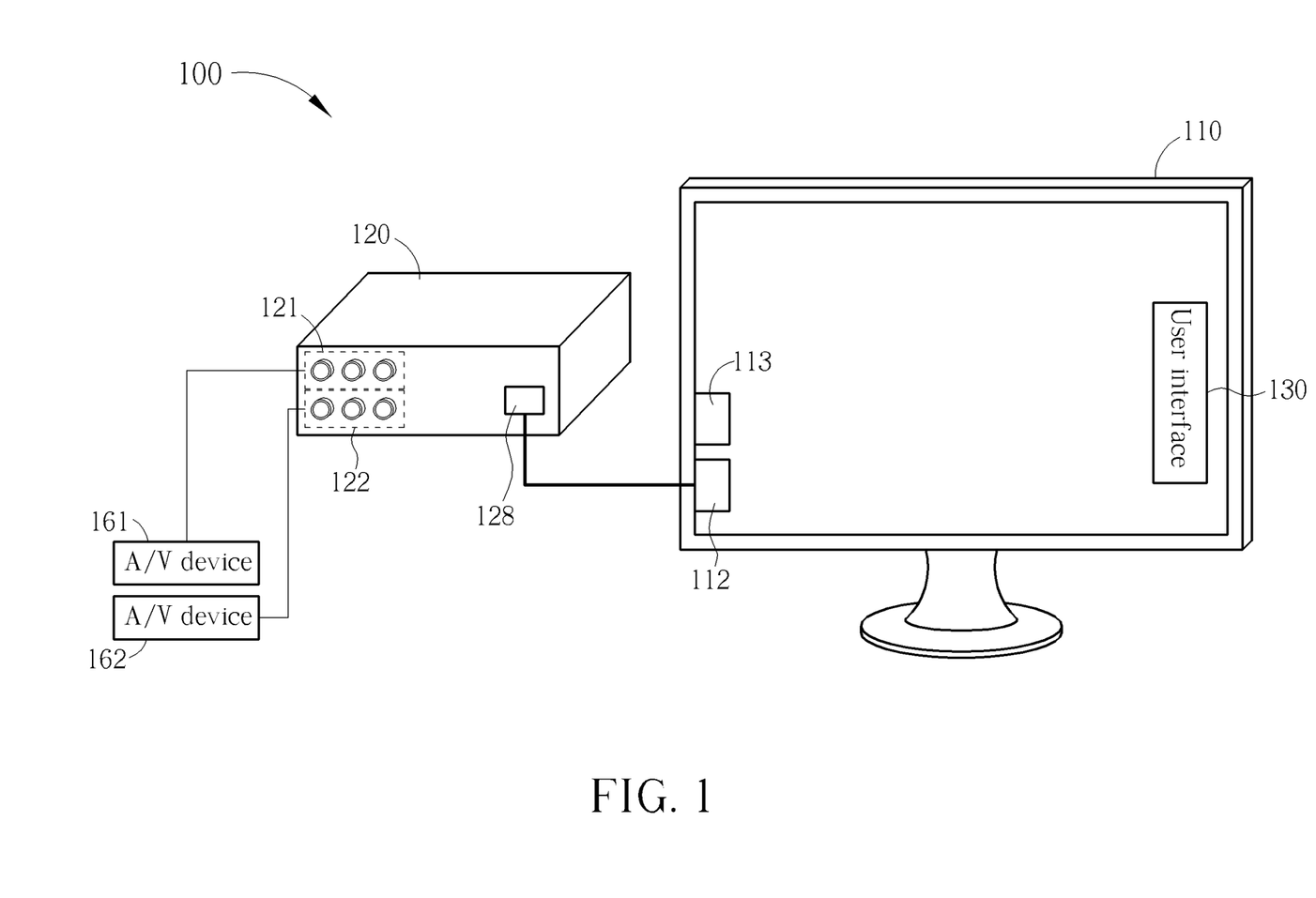
FIG. 1 shows an A/V system of the present invention.

Please refer to FIG. 1, which shows an A/V system 100 of the present invention. As shown in FIG. 1, the A/V system 100 comprises a display 110 and a multimedia set-top box 120. The display 110 comprises first HDMI connection port 112 and the connection port 113 as input sources, and the multimedia set-top box 120 comprises a second HDMI connection port 128 and A/V signal input ports 121 and 122. The A/V signal input ports 121 and 122 can be component video connectors, composite video connectors, DVI ports, VGA ports and USB ports. However, the present invention does not limit the A/V signal input ports 121 and 122 to the abovementioned types, and the numbers of the A/V signal input ports 121 and 122 can be varied. The display 110 can generate a user interface 130 to be displayed on the screen, and the user interface 130 can be operated with a remote control or through directly pressing the control buttons on the display 110. The connection port 113 can be an HDMI port or port of other type, and the number of the connection ports coupled to the display 110 is not limited in the present invention.

The signal transmission between the display 110 and the multimedia set-top box 120 is through an HDMI cable coupling the first HDMI connection port 112 and the second HDMI connection port 128. In addition, the transmission of commands between the first HDMI connection port 112 and the second HDMI connection port 128 conforms to the HDMI consumer electronic control (CEC) standard. In the present embodiment, the A/V signal input ports 121 and 122 can be respectively coupled to the A/V devices 161 and 162. Thus, the user can operate a remote control of display 110 in order to display A/V data stored in the A/V device 161 or 162 on the display 110. The A/V device 161 or 162 can be storage devices such as computers, hard drives or USB disks.

The CEC standard provides multiple applications for multiple electronic devices connected with HDMI cables. With the CEC standard, the user can control all the connected electronic devices through merely providing commands to one of the electronic devices, so that interaction among the electronic devices can be performed. For example, the CEC standard provides multiple standby commands for a system, which can allow the user to force all electronic devices connected with HDMI cables to enter into standby state by issuing a system standby command, or allow the user to force a specific electronic device in the system to enter into standby state by issuing a specific standby command through an HDMI cable to the specific electronic device. Further, the CEC standard provides bidirectional transmissions of system commands among the electronic devices, that is, commands can be transmitted to the multimedia set-top box 120 from the display 110, and can be also transmitted to the display 110 from the multimedia set-top box 120. The detailed contents of the CEC standard are enacted in the current version of HDMI standard, thus will not be further described hereinafter. The current CEC standard only provides commands inputted by the user which can be received by the electronic devices passively. For example, the user can control both the display 110 and multimedia set-top box 120 with one remote control when the display 110 is coupled to the multimedia set-top box 120 through a HDMI cable, and the display 110 and the multimedia set-top box 120 will passively receive the commands inputted by the user and perform related procedures. However, the CEC standard does not provide any functions to electronic devices that allow the electronic devices to automatically communicate or interact when the electronic devices are coupled or switched in the system. Thus, the user still has to input related commands to the electronic devices one by one.

Figure 2:
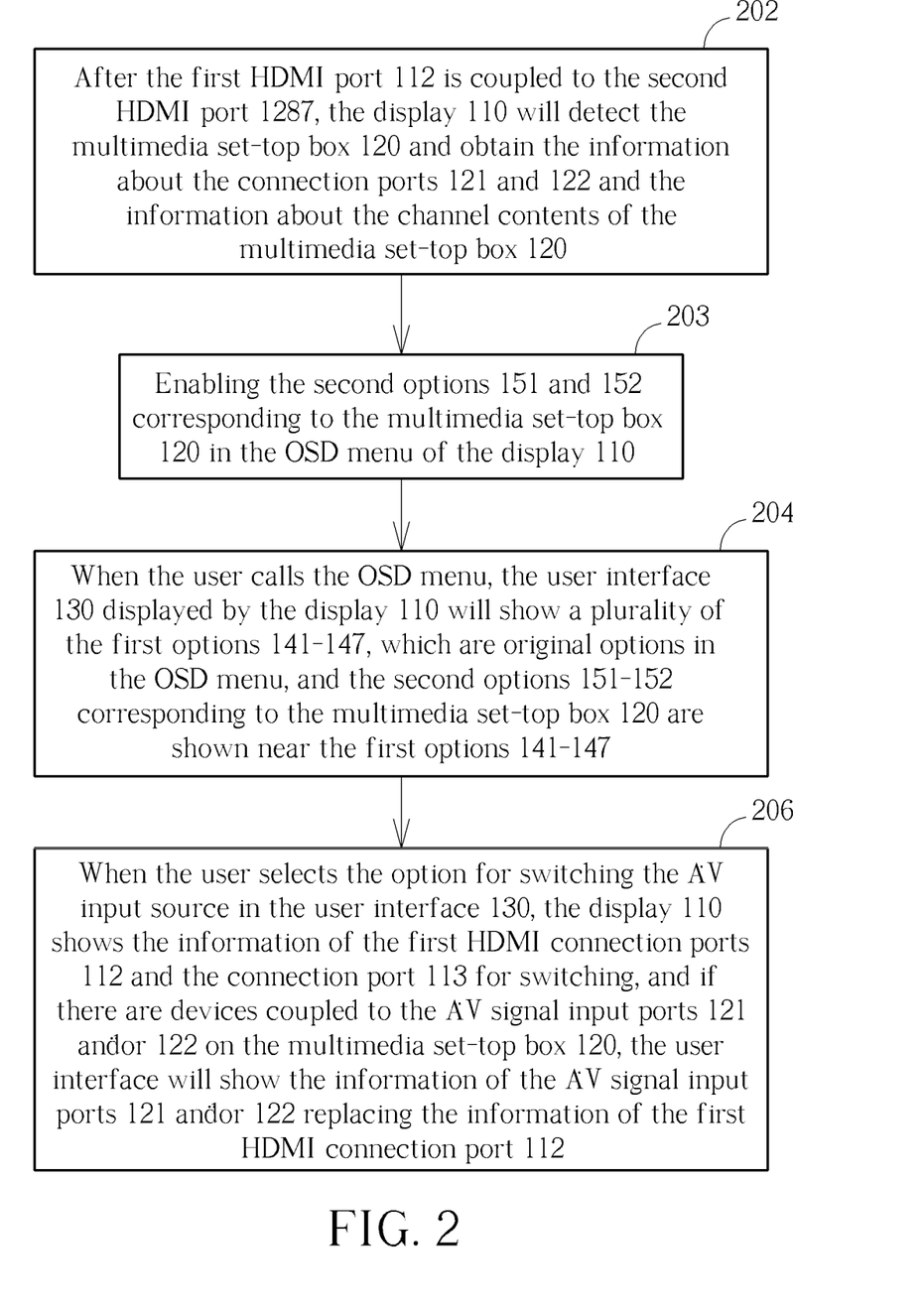
FIG. 2 shows a method of controlling the A/V system in FIG. 1 according to a first embodiment of the present invention.
Figure 3A:
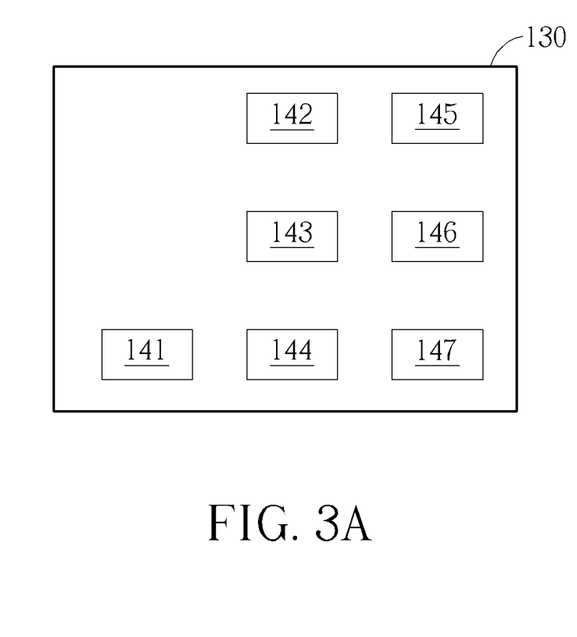
FIG. 3A is a figure showing the user interface in FIG. 1.
Figure 3B:
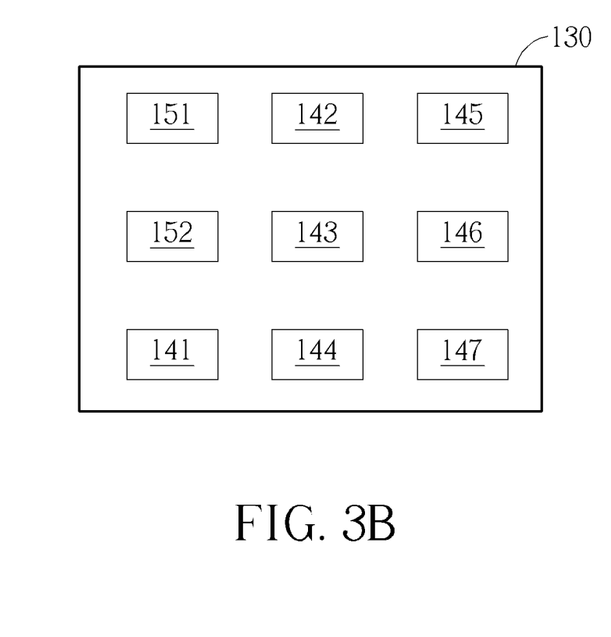
FIG. 3B is another figure showing the user interface in FIG. 1.

Please refer to FIGS. 2, 3A and 3B. FIG. 2 shows a method for controlling the A/V system 100 in FIG. 1 according to an embodiment of the present invention, FIG. 3A is a figure showing the user interface 130 in FIG. 1, and FIG. 3B is another figure showing the user interface 130 in FIG. 1. The detailed descriptions of FIG. 2 are as follows:

Step 202: after the first HDMI port 112 is coupled to the second HDMI port 1287, the display 110 will detect the multimedia set-top box 120 and obtain the information about the connection ports 121 and 122 and the information about the channel contents of the multimedia set-top box 120;

Step 203: enabling the second options 151 and 152 corresponding to the multimedia set-top box 120 in the OSD menu of the display 110;

Step 204: when the user calls the OSD menu, the user interface 130 displayed by the display 110 will show a plurality of the first options 141-147, which are original options in the OSD menu, and the second options 151-152 corresponding to the multimedia set-top box 120 are shown near the first options 141-147;

Step 206: when the user selects the option for switching the A/V input source in the user interface 130, the display 110 shows the information of the first HDMI connection ports 112 and the connection port 113 for switching, and if there are devices coupled to the A/V signal input ports 121 and/or 122 on the multimedia set-top box 120, the user interface will show the information of the A/V signal input ports 121 and/or 122 replacing the information of the first HDMI connection port 112.

In an embodiment of the present invention, the first options 141-147 and the second options 151-152 can be shown as icons with descriptions. When the first HDMI connection port 112 is not coupled to the second HDMI connection port 128, the user interface 130, which may be as depicted in FIG. 3A, shows only the first options 141-147 which are the original options in the OSD menu of display 110. In Step 202, when the first HDMI connection port 112 is coupled to the second HDMI connection port 128, the display 110 will detect the multimedia set-top box 120 and the devices coupled to the A/V signal input ports 121-122 on the multimedia set-top box 120 as well. The display 110 will enable the second options 151 and 152, which are corresponding to the multimedia set-top box 120. Thus, the user interface 130 of the display 110 will show the second options 151-152 near the first options 141-147. When the display 110 or the multimedia set-top box 120 detects that the first HDMI connection port 112 is coupled to the second HDMI connection port 128, the multimedia set-top box 120 will transmit raw data to the display 110. The raw data may comprise the information of the A/V signal input ports 121-122 and the information of the devices connected to the A/V signal input ports 121-122, the contents of channels, electronic program guides (EPG) received by the multimedia set-top box 120, and various settings of the multimedia set-top box 120. Thus, the display 110 can enable the functions of the second options 151-152 according to the raw data, and shows the corresponding icons on the user interface 130 to be selected by the user. In this way, the user can use the remote control of the display 110 to control the operation of multimedia set-top box 120. Moreover, if the devices coupled to the A/V signal input ports 121-122 on the multimedia set-top box 120 are compatible with the HDMI standard, the user may also control these devices through operating the remote control of the display 110.

Besides enabling the second options 151 and 152, the functions of first options 141-147 in the user interface 130 can be also updated accordingly after the display 110 receives the raw data. For example, if there are devices coupled to the A/V signal input ports 121 and/or 122 on the multimedia set-top box 120, the option for selecting the A/V input source in the user interface 130 of the display 130 may show the connection port 113 and the A/V signal input ports 121-122 without showing the first HDMI connection port 112 for selection of input source. Further, the display 110 can integrate the received channel data of the multimedia set-top box 120 and the channel data of the display 110 and generate an integrated channel list in the option for switching channels. For example, the display 110 can be a TV for receiving multiple TV channels, and the multimedia set-top box 120 can provide the video-on-demand (VOD) service or receive A/V signals from other connected playback devices. After the display 110 is coupled to the multimedia set-top box 120, the display 110 can receives the information of A/V signals from the multimedia set-top box 120 and integrate the A/V signals with the TV channels as virtual channels provided by the multimedia set-top box 120. Thus, the user can utilize the remote control of the display 110 to switch channels included in the integrated channel list, including the TV channels belonging to the display 110 and the virtual channels belonging to the multimedia set-top box 120, and the input sources of the display 110 will be switched with the channel switching automatically. That is, when the currently displayed TV channel, belonging to the display 110, is switched to a virtual channel, belonging to the multimedia set-top box 120, the display 110 will automatically switch the input source to the multimedia set-top box 120 and receive A/V data of the virtual channel, thus the user need not first manually switch the input source to the multimedia set-top box 120 and then select the desired A/V content provided by the multimedia set-top box 120. In addition, the display 110 can generate the integrated channel list by assigning successive numbers to the TV channels and virtual channels, wherein the assigned channel numbers can be increased or decreased progressively. For example, the channel numbers of the TV channels can be configured to be 1 to 100, and the channel numbers of the virtual channels can be configured to be 101 to 130. Besides, the channel numbers of the virtual channels can be also configured as minor channels, such as be 1-1, 2-1, . . . , and 30-1, or 1-1 to 1-30. After the display 110 receives the settings of the multimedia set-top box 120, the display 110 can generate setting options for images, sounds, channels or system corresponding to the multimedia set-top box 120. Thus, the user can directly set the multimedia set-top box 120 with the remote control of the display 110, and the display 110 will transmit the setting commands to the multimedia set-top box 120 for processing.

According to an embodiment of the present invention, the icons of the plurality of options in the user interface 130 are not limited to be arranged in the nine-square division manner as depicted in FIGS. 3A and 3B, and can be arranged in other ways. For example, the plurality of options in the user interface 130 can be shown as a pull-down menu, pull-up menu, tree structure, or other graphical or textual form. Moreover, the abovementioned options for switching channels and A/V input source can be part of the first options 141-147 or the enabled second options 151-152, or belong to the system setting option of the display 110. When the user selects a system setting option in the first options 141-147, the display 110 will display minor options for setting the display 110 or the multimedia set-top box 120, so the user can operate accordingly.

According to an embodiment of the present invention, the raw data transmitted to the display 110 from the multimedia set-top box 120 may also comprise data of application programs to be processed by the display 110. When transmitting raw data, the transmissions can be performed following existing connection interfaces standard and protocols in the A/V system 100. For example, the pin 14 or pin 19 of HDMI standard interface can be utilized to transmit raw data. The aforementioned pins can be utilized to transmitting data optionally as a universal asynchronous receiver/transmitter (UART) or an inter-integrated circuit ($I^2C$). In an embodiment of the present invention, the connection port 113 of the display 110 can be further coupled to the multimedia set-top box 120 in order to provide another transmission path for transmitting large raw data. For example, the connection port 113 can include an USB port for coupling to the multimedia set-top box 120 and providing data transmission function. In another embodiment of the present invention, the transmission of raw data between the display 110 and the multimedia set-top box 120 can utilize wireless transmitters/receives following wireless communications protocols and needs no connection of physical cable.

In the prior art, the user interface of the set-top box is generated by the set-top box itself and transmitted to the display along with the image data to be displayed. However, the commands from the user still have to be received by the set-top box, and then the set-top box will process the commands and transmit the result images to the display, so that the user can see the result images from the display. In this way, severe delay exists between the operation of the user and showing of the result images. In the present invention, the raw data is firstly transmitted to the display 110 from the multimedia set-top box 120, and then the display 110 enables the second options 151-152 and the additional functions of the first options 141 to 147 corresponding to the multimedia set-top box 120 in the user interface 130, thus improving the defects in the prior art and the HDMI CEC standard. After the display 110 receives the raw data and enables related functions, the user can control the multimedia set-top box 120 through using the remote control of the display 110 to send commands to the display 110. After receiving commands from the user, the display 110 will generate control signals and transmit the control signals to the multimedia set-top box 120 for processing. If a few peripheral devices are coupled to the multimedia set-top box 120, the multimedia set-top box 120 can also receive the raw data of the peripheral devices, and transmit the received raw data to the display 110. After that, the display 110 will enable additional options and functions of enabled or original options corresponding to the peripheral devices coupled to the multimedia set-top box 120, so the user can control the multimedia set-top box 120 and the peripheral devices coupled thereto by using the remote control of the display 110 to send operation commands. Compared with the prior art, the system and method of the present invention can increase the transmission and processing speed and efficiency, and solve the delay problem in the prior art system. In other words, the present invention provides real-time control operations of the multimedia set-top box 120 and the peripheral devices in the system for users.

Figure 4:
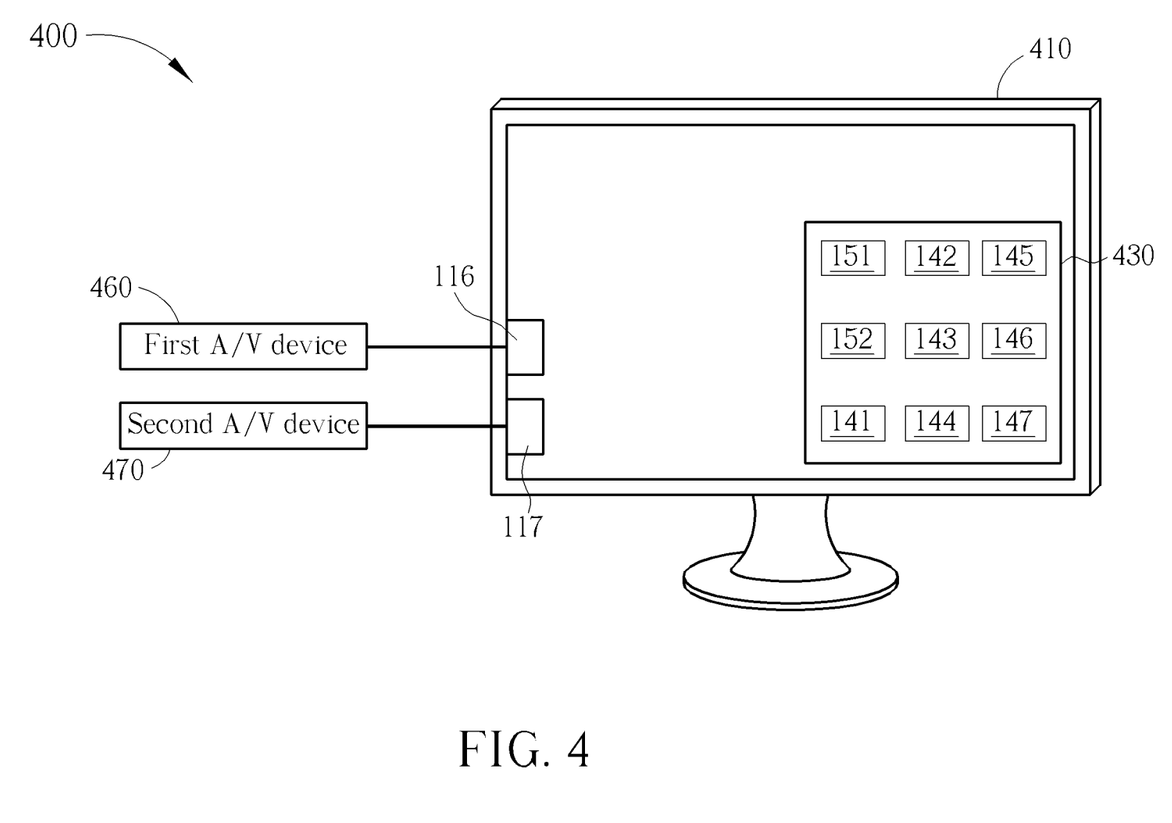
FIG. 4 shows an A/V system of the present invention.
Figure 5:
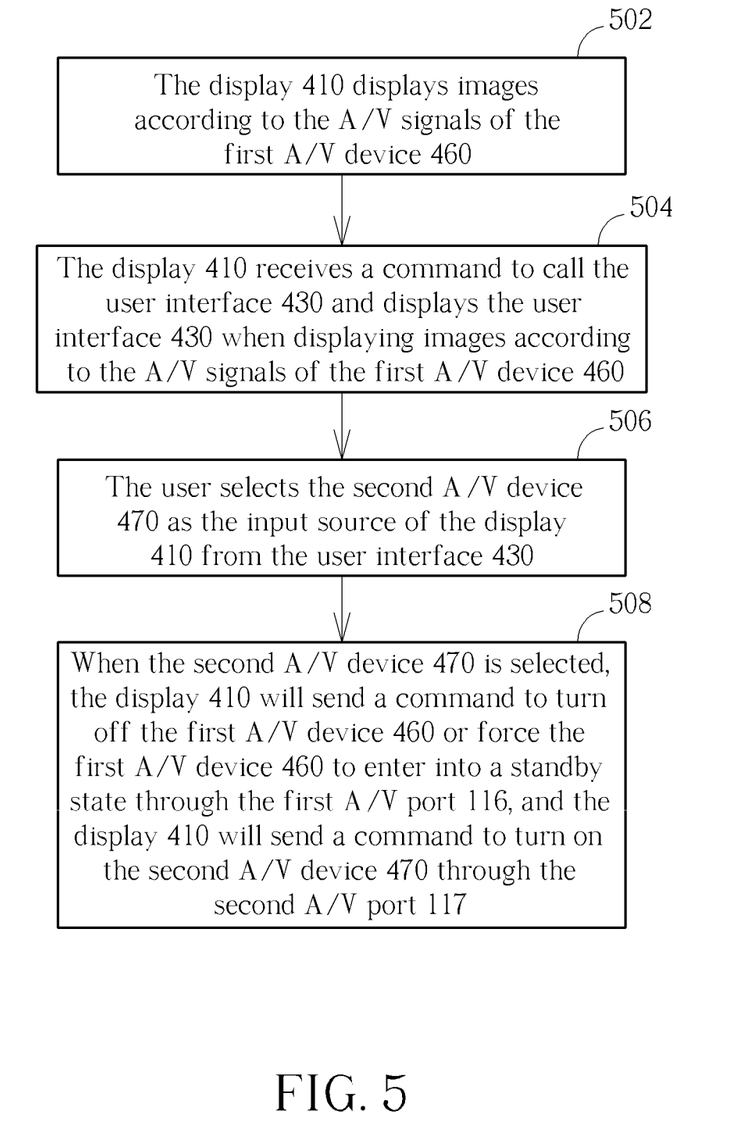
FIG. 5 shows a method of controlling the A/V system in FIG. 4 according to a second embodiment of the present invention.

Please refer to FIGS. 4 and 5. FIG. 4 shows an A/V system 400 of the present invention, and FIG. 5 shows a method for controlling the A/V system 400 in FIG. 4 according to an embodiment of the present invention. In the A/V system 400, the first A/V port 116 is used as an A/V signal input port of the display 410, and a second A/V port 117 is used as another A/V signal input port of the display 410. The first A/V port 116 and the second A/V port 117 can be HDMI ports or VGA ports.

According to an embodiment of the present invention, if no devices are coupled to the display 410, the user interface 410 of the display 410 will merely show the first options 141-147, which are the original options in OSD menu of the display 410. However, when the first A/V port 116 is coupled to a first A/V device 460 and the second A/V port 117 is coupled to a second A/V device 470, the display 410 will detect the first A/V device 460 and the second A/V device 470 and receive the raw data thereof. After receiving the raw data of the first A/V device 460 and the second A/V device 470, the display 410 will enable the second options 151-152 or the additional functions in the first options 141-147 corresponding to the first A/V device 460 and the second A/V device 470. The present invention does not limit the number of the HDMI ports and the number of the A/V devices coupled to the display 410. The first A/V device 460 and the second A/V device 470 can be any A/V devices such as computer devices, DVD players or multimedia set-top boxes. The detailed descriptions of FIG. 5 are as follows:

Step 502: the display 410 displays images according to the A/V signals of the first A/V device 460;

Step 504: the display 410 receives a command to call the user interface 430 and displays the user interface 430 when displaying images according to the A/V signals of the first A/V device 460;

Step 506: the user selects the second A/V device 470 as the input source of the display 410 from the user interface 430;

Step 508: when the second A/V device 470 is selected, the display 410 will send a command to turn off the first A/V device 460 or force the first A/V device 460 to enter into a standby state through the first A/V port 116, and the display 410 will send a command to turn on the second A/V device 470 through the second A/V port 117.

In Step 502, the display 410 may also play the audio data along with the video data from the A/V device 460. In Step 508, if the first A/V port 116 and the second A/V port 117 are HDMI ports, the display 410 can turn off the first A/V device 460 through the first A/V signal 116 with the CEC commands. If the first A/V port 116 and the second A/V port 117 are VGA ports, the display 410 can turn off the first A/V device 460 through sending DDC2B+ commands to the first A/V device 460.

Though the display 410 might be coupled to multiple A/V devices, the user probably does not watch content from more than one A/V device at one time, and the user may switch the input source of the display 410 among the multiple A/V devices to search the content desired to watch. It is important to reduce the power consumption of devices whose contents are not being currently watched. Steps 504 and 506 describe the scenario that the user calls for the ODD menu. The display 410 will show the ODS menu right after receiving the commands from the user. The user can select the A/V input source switching option in the OSD menu, and the display 410 will display the interface for switching input source to the user, wherein the interface for switching input source may comprise a list, a menu, or other selection format of selectable input sources. At Step 506, the second A/V device 470 is selected as the current A/V input source of the display 410. And then in Step 508, the display 410 will transmit a CEC command or DDC2B+ command to the second A/V device 470 to wake up the second A/V device 470. In this way, the second A/V device 470 will be turned on and begin to process A/V data. After that, the display 410 can display the contents from the second A/V device 470. Moreover, the display 410 will transmit CEC commands or DDC2B+ commands to the devices which are not the current input source to shut down those devices, e.g. the first A/V device 460, in Step 508. The devices which are not the current input source will enter into standby state after receiving the CEC commands or DDC2B+ commands comprising standby commands. In an embodiment of the present invention, after receiving the commands for switching the currently displayed A/V signal source, the display 410 will wait a predetermined period of time and transmit the standby commands to peripheral devices which are not the current input source if there is no other command for switching input source received from the user in the predetermined period of time. Thus, if the user keeps switching input sources during the predetermined period of time, the display 410 will not wake up the peripheral devices which just enter into the standby state immediately. In this way, the peripheral devices can be prevented from keeping turning on and off while the user keeps switching input source. Until the input source selection stops long enough, the peripheral devices which are not current input source will enter into the standby state. Further, according to an embodiment of the present invention, the display 410 can transmit the standby commands to the peripheral devices right after each time the display 410 receives command to switch the current input source, and the peripheral devices will wait a predetermined period of time and enter into the standby state if no other standby or wake up command is received in the predetermined period of time, so as to avoid being waked up immediately after entering into standby state by the display 410.

The A/V system of the present invention can automatically manage the power state of a plurality of peripheral devices in order to reduce the overall power consumption, and each A/V device in the A/V system will be turned on or off automatically after the user switches current input source of the display in the A/V system. According to an embodiment of the present invention, the display 410, the first A/V device 460 and the second A/V device 470 can be controlled with one single remote control. Besides, the display 410 can be informed of the power states of the A/V devices according to the CEC commands or DDC2B commands returned from the A/V devices. According to an embodiment of the present invention, the user can use the single remote control to control the first A/V device 460, the second A/V device 470 but also the peripheral devices coupled to the first A/V device 460, the second A/V device 470. The first A/V device 460 and the second A/V device 470 can transmit the raw data and states of the peripheral devices coupled thereto to the display 410 through HDMI or VGA interface, so the display 410 can arrange the power state of a specific peripheral device. If the first A/V port 116 and the second A/V port 117 are VGA ports, the transmission between the display 410 and the first A/V device 460 or the second A/V device 470 is defined to utilize the pins of VGA interface to transmit specific commands and compatible with the VGA interface standard. For example, Pin 12 of the VGA interface can transmit data compatible with the DDC2B+ protocol and some kinds of data can be pre-defined as control commands in the A/V system. As long as the first A/V device 460 or the second A/V device 470 can identify the data transmitted from the display device 410 through the VGA interfaces are specific commands and execute accordingly, the display 410 can control the first A/V device 460 or the second A/V device 470 through the VGA interface. Though the applications of the VGA interface are described above, the present invention is not limited to utilize the Pin 12 or the DDC2B+ protocol only. The DDC2B+ protocol is an exemplary protocol allowing bi-directional code transmissions between the host and the display, where the control commands are delivered to the display from the host. Other similar protocol or usable pin can be utilized in the present invention instead.

In view of above, the embodiments of the present invention provide the A/V systems 100, 400 and method for controlling the A/V systems 100, 400. The displays 110, 410 and other peripheral A/V devices in the A/V system can be controlled with one single remote control. The display 110 integrates the control options of the peripheral A/V devices into the OSD menu of the display 110. Moreover, the present invention can greatly reduce the delay of indirectly control the multimedia set-top box 120 through display 110, so real-time operations for the user can be achieved. In addition, the display 410 can automatically turn off coupled A/V devices which are not the input source when the input source is switched by the user, so as to save energy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An audio/video system, comprising:
a display having a plurality of input sources;
a first peripheral device connected to one of the input sources, wherein the display provides a user interface for receiving a switching command for switching current input source of the display among the input sources from a user, and the display automatically generates a first standby command to the first peripheral device when the received switching command is not switching the current input source to the input source corresponding to the first peripheral device; and
a second peripheral device connected to the display, wherein the second peripheral device comprises at least one audio/video input port coupled to a first audio/video device, the display identifies the first audio/video device through the second peripheral device, and the display generates a second standby command to be transmitted to the first audio/video device through the second peripheral device when the first peripheral device is selected as current input source of the display by the user.

2. The system of claim 1, wherein the display is coupled to the second peripheral device with a first transmission line compatible with a first transmission standard, and the second peripheral device is coupled to the first audio/video device with a second transmission line compatible with a second transmission standard, and the second transmission standard is different from the first transmission standard.

3. The system of claim 1, further comprising a second peripheral device connected to the display, wherein the display is coupled to the second peripheral device with a first transmission line compatible with a first transmission standard, and the display is coupled to the first peripheral device with a second transmission line compatible with a second transmission standard, and the second transmission standard is different from the first transmission standard.

4. The system of claim 1, wherein after the first peripheral device receives the first standby command, the first peripheral device will enter into standby state if the user does not send another command to switch current input source of the display in a predetermined time period.

5. The system of claim 1, wherein the first peripheral device transmits information of audio or video provided by the first peripheral device to the display, and the display adds a virtual channel of audio or video provided by the first peripheral device in an existed channel list stored in the display.

6. The system of claim 1, wherein the first peripheral device transmits raw data of the first peripheral device to the display, and the display enables a function corresponding to the first peripheral device in the user interface after receiving the raw data of the first peripheral device.

7. A method of controlling an audio/video system, the audio/video system comprising a display, a first peripheral device and a second peripheral device connected to the display, the second peripheral device comprising at least one audio/video input port coupled to a first audio/video device, the method comprising:
receiving a command to switch current input source of the display, wherein the command to switch current input source of the display selects the first peripheral device as current input source of the display;
the display selecting the first peripheral device as current input source, and receiving and displaying image data from the first peripheral device;
the display automatically generating a first standby command to be transmitted to the second peripheral device; and
the display automatically generating a second standby command to be transmitted to the first audio/video device through the second peripheral device if the display no longer selects the first peripheral device as current input source.

8. The method of claim 7, further comprising:
the second peripheral device receiving the first standby command; and
if the second peripheral device does not receive another command to switch current input source of the display in a predetermined time period, the second peripheral device entering into standby state after the predetermined time period.

9. The method of claim 7, wherein the display is coupled to the second peripheral device with a first transmission line compatible with a first transmission standard, and the display is coupled to the first peripheral device with a second transmission line compatible with a second transmission standard, and the second transmission standard is different from the first transmission standard.

10. The method of claim 7, further comprising:
if the display does not receive another to switch current input source of the display in a predetermined time period, the display transmitting the first standby command to the second peripheral device.

11. The method of claim 7, further comprising:
receiving information of audio or video provided by the first peripheral device; and
adding a virtual channel of audio or video provided by the first peripheral device in an existed channel list.

12. The method of claim 7, further comprising:
receiving raw data of the first peripheral device; and
enabling a function corresponding to the first peripheral device in the user interface of the display after receiving the raw data of the first peripheral device.

13. A display device, comprising:
a display component;
a first connection port capable of coupling to a first peripheral device;
a second connection port capable of coupling to a second peripheral device;
a processor, connected to the display unit, generating a graphical user interface to be displayed by the display component, which allows a user to control the display device accordingly;

wherein the user interface provides an input source switching function, and when the display device receives a command to switch current input source which selects the first peripheral device as current input source of the display device, the processor will set the first peripheral device as current input source of the display device and automatically generates a standby command to the second peripheral device;

wherein the display receives information of audio or video provided by the first peripheral device, and the processor adds a virtual channel of audio or video provided by the first peripheral device in an existed channel list stored in the display.

14. The display device of claim 13, wherein when the display device receives the command to switch current input source, the processor will automatically generate the standby command and transmit the standby command to the second peripheral device if the processor does not receive another command to switch current input source in a predetermined time period.

15. The display device of claim 13, wherein the display receives raw data of the first peripheral device, and the processor enables a function corresponding to the first peripheral device in the graphical user interface based on the raw data of the first peripheral device.

16. The display device of claim 13, wherein the first connection port is coupled to the first peripheral device with a first transmission line compatible with a first transmission standard, and the second connection port is coupled to the second peripheral device with a second transmission line compatible with a second transmission standard, and the second transmission standard is different from the first transmission standard.

17. The display device of claim 13, wherein when the display device receives the command to switch current input source, the processor will automatically generate the standby command and transmit the standby command to the second peripheral device, and the second peripheral device enters into standby state if the display device does not receive another command to switch current input source in a predetermined time period.

* * * * *